United States Patent
Yu et al.

(10) Patent No.: US 10,502,489 B2
(45) Date of Patent: Dec. 10, 2019

(54) COAL SLURRY PREHEATER AND COAL GASIFICATION SYSTEM AND METHOD USING THE SAME

(71) Applicant: Air Products and Chemicals, Inc., Allentown, PA (US)

(72) Inventors: Liang Yu, ShangHai (CN); Junli Xue, ShangHai (CN); Xijing Bi, ShangHai (CN); Jing Lv, ShangHai (CN)

(73) Assignee: Air Products and Chemicals, Inc., Allentown, PA (US)

( * ) Notice: Subject to any disclaimer, the term of this patent is extended or adjusted under 35 U.S.C. 154(b) by 45 days.

(21) Appl. No.: 15/004,250

(22) Filed: Jan. 22, 2016

(65) Prior Publication Data

US 2017/0002280 A1   Jan. 5, 2017

(30) Foreign Application Priority Data

Jan. 23, 2015   (CN) .......................... 2015 1 0035717

(51) Int. Cl.
  *C10J 3/86* (2006.01)
  *C01B 3/02* (2006.01)
  (Continued)

(52) U.S. Cl.
  CPC .............. *F27D 13/00* (2013.01); *C10J 3/506* (2013.01); *C10J 3/526* (2013.01); *F27D 17/004* (2013.01);
  (Continued)

(58) Field of Classification Search
  CPC ....... C10J 3/86; C10J 3/485; C10J 3/84; C10J 2200/09; C10J 2300/1628; C10J 2300/169;
  (Continued)

(56) References Cited

U.S. PATENT DOCUMENTS

| 3,340,830 | A |   | 9/1967  | Frey et al. |
| 3,988,123 | A | * | 10/1976 | Coates .................... C10J 3/485 48/73 |

(Continued)

FOREIGN PATENT DOCUMENTS

EP   0020690 B1   10/1982

OTHER PUBLICATIONS

Aiuchi et al., "A pre-heating vaporization technology of coal-water-slurry for the gasification process", Fuel Processing Technology, Science Direct, vol. 88, Issue 4, pp. 325-331, Apr. 2007.

*Primary Examiner* — Imran Akram
(74) *Attorney, Agent, or Firm* — Amy Carr-Trexler

(57) ABSTRACT

This invention involves with a gasification system, which includes a gasifier, which gasifier comprises a gasification chamber for producing syngas from coal slurry and a quench chamber for cooling the syngas from the gasification chamber. The mentioned gasification system also comprises preheater located in the quench chamber for utilizing heat in the quench chamber to preheat the coal slurry before the coal slurry enters the gasification chamber. Wherein, the preheater comprises a pipe device defining a passage for the coal slurry to pass through, the passage in communication with the gasification chamber and upstream of the gasification chamber in a flow direction of the coal slurry. This invention also involves with a preheater used in the mentioned gasification system and the gasification method of the mentioned gasification device.

17 Claims, 7 Drawing Sheets

(51) Int. Cl.
*F27D 13/00* (2006.01)
*C10J 3/48* (2006.01)
*F27D 17/00* (2006.01)
*B01J 7/02* (2006.01)
*C10J 3/46* (2006.01)
*C10J 3/50* (2006.01)
*C10J 3/52* (2006.01)

(52) U.S. Cl.
CPC .. *C10J 2300/093* (2013.01); *C10J 2300/0926* (2013.01); *C10J 2300/1861* (2013.01); *C10J 2300/1884* (2013.01)

(58) Field of Classification Search
CPC ..... C10J 3/506; C10J 3/526; C10J 3/72; C10J 3/845
See application file for complete search history.

(56) References Cited

U.S. PATENT DOCUMENTS

| | | | | |
|---|---|---|---|---|
| 4,057,402 A | * | 11/1977 | Patel | C10J 3/482 48/197 R |
| 4,284,416 A | | 8/1981 | Nahas | |
| 4,309,196 A | * | 1/1982 | Vollhardt | C10J 3/00 48/77 |
| 4,328,008 A | | 5/1982 | Muenger et al. | |
| 4,411,765 A | | 10/1983 | Matsuura et al. | |
| 4,514,910 A | | 5/1985 | Elmore et al. | |
| 4,707,163 A | * | 11/1987 | Gudymov | C10J 3/485 48/73 |
| 5,380,342 A | | 1/1995 | Leonard, III et al. | |
| 5,445,658 A | * | 8/1995 | Durrfeld | C10J 3/485 122/7 R |
| 5,752,994 A | * | 5/1998 | Monacelli | C10J 3/54 48/111 |
| 6,032,467 A | * | 3/2000 | Oshita | C10J 3/54 60/39.12 |
| 7,763,167 B2 | | 7/2010 | Zhang et al. | |
| 8,349,036 B2 | | 1/2013 | Russell et al. | |
| 8,378,275 B2 | | 2/2013 | Novak | |
| 8,486,165 B2 | | 7/2013 | Arya et al. | |
| 2007/0051043 A1 | | 3/2007 | Schingnitz et al. | |
| 2008/0172941 A1 | * | 7/2008 | Jancker | C10J 3/485 48/73 |
| 2008/0175769 A1 | * | 7/2008 | Goller | F28D 7/0041 422/201 |
| 2009/0199474 A1 | * | 8/2009 | Leininger | C10J 3/52 48/69 |
| 2009/0283450 A2 | | 11/2009 | Zhang et al. | |
| 2010/0313442 A1 | * | 12/2010 | Russell | F23K 1/04 34/468 |
| 2011/0072721 A1 | * | 3/2011 | Chen | F02C 3/28 48/87 |
| 2011/0114291 A1 | * | 5/2011 | Dostal | B01J 19/0013 165/104.19 |
| 2011/0179712 A1 | | 7/2011 | Thacker et al. | |
| 2012/0005959 A1 | * | 1/2012 | Chen | C01B 3/36 48/61 |
| 2013/0292087 A1 | * | 11/2013 | Heitmann | C10J 3/76 165/67 |
| 2014/0048744 A1 | * | 2/2014 | Avagliano | C10K 1/04 252/372 |
| 2015/0137040 A1 | * | 5/2015 | Pan | C10J 3/485 252/373 |
| 2015/0240171 A1 | * | 8/2015 | Mani | C10J 3/526 252/373 |
| 2016/0122669 A1 | * | 5/2016 | Mohammad | C10J 3/485 252/373 |

* cited by examiner

COAL SLURRY PREHEATER AND COAL GASIFICATION SYSTEM AND METHOD USING THE SAME

TECHNICAL FIELD

This invention involves with a coal slurry preheater for coal gasification system and method for the coal gasification system and method that utilizing the mentioned preheater.

BACKGROUND ART

The fossil fuel like coal, coke or petroleum, etc could be used to generate electricity, produce chemical products or synthetic fuel, or for various other usages by gasification. The mentioned gasification involves with that producing the syngas that containing CO and hydrogen by reaction of carbonaceous fuel and oxygen under high temperature. For instance, a widely used fossil fuel gasification technology is that coal water slurry gasification technology that gasification with coal water slurry as the raw material, with the character of simple structure of gasification furnace, wide availability of coal type and easy control of feeding, etc. Wherein, the coal water slurry is the mixture prepared by 60%-70% coal with different particle size, about 29-39% water and about 1% chemical additive. In the current coal water slurry gasification technology, in general, the coal water slurry raw material with low temperature is added directly into the gasification furnace, further, under the high temperature and high pressure condition in the gasification furnace, for instance, under the condition of about 1000-1500° C. temperature and about 4.0-9.0 Mpa pressure, the syngas is achieved by gasification.

SUMMARY OF THE INVENTION

In one embodiment, this invention involves with a gasification system, which includes a gasifier. The gasifier comprises a gasification chamber for producing syngas from coal slurry and a quench chamber for cooling the syngas from the gasification chamber. The mentioned gasification system also comprises a preheater located in the quench chamber for utilizing heat in the quench chamber to preheat the coal slurry before the coal slurry enters the gasification chamber. The preheater comprises a pipe device defining a passage for the coal slurry to pass through. The passage is in communication with the gasification chamber and upstream of the gasification chamber in a flow direction of the coal slurry.

In another embodiment, this invention involves with a coal slurry preheater, which is applicable in a gasifier comprising a gasification chamber for producing syngas from coal slurry, a quench chamber for cooling the syngas from the gasification chamber, and a downcomer pipe for passing the syngas from the gasification chamber to the quench chamber. The mentioned coal slurry preheater comprises an inlet for receiving coal slurry to be preheated; an outlet for outputting preheated coal slurry and communicating with an inlet of the gasification chamber; and a pipe device connecting with the inlet and outlet. A pipe device defines a passage in communication with the inlet and outlet. The passage allows the coal slurry to flow therein. The pipe device comprises a pipe substantially wound as a cylinder, where the cylinder has an outer diameter smaller than an inner diameter of the quench chamber and an inner diameter larger than an outer diameter of the downcomer pipe, and the cylinder could be installed between the mentioned downcomer pipe and the inner wall of the mentioned quench chamber.

Further, this invention involves with a gasification method, which comprises that producing syngas from coal slurry in a gasification chamber of a gasifier; cooling the syngas from the gasification chamber in a quench chamber of the gasifier; passing the coal slurry through a preheater located in the mentioned quench chamber to preheat the coal slurry passing through the mentioned preheater by the heat in the mentioned quench chamber; and feeding the preheated coal slurry to the gasification chamber for producing the syngas.

BRIEF DESCRIPTION OF THE DRAWINGS

By describing the embodiment of this invention together with the attached drawings, this invention could be better understood, within the attached drawing:

Drawing 1 shows coal gasification system in an embodiment.

Figure 1:
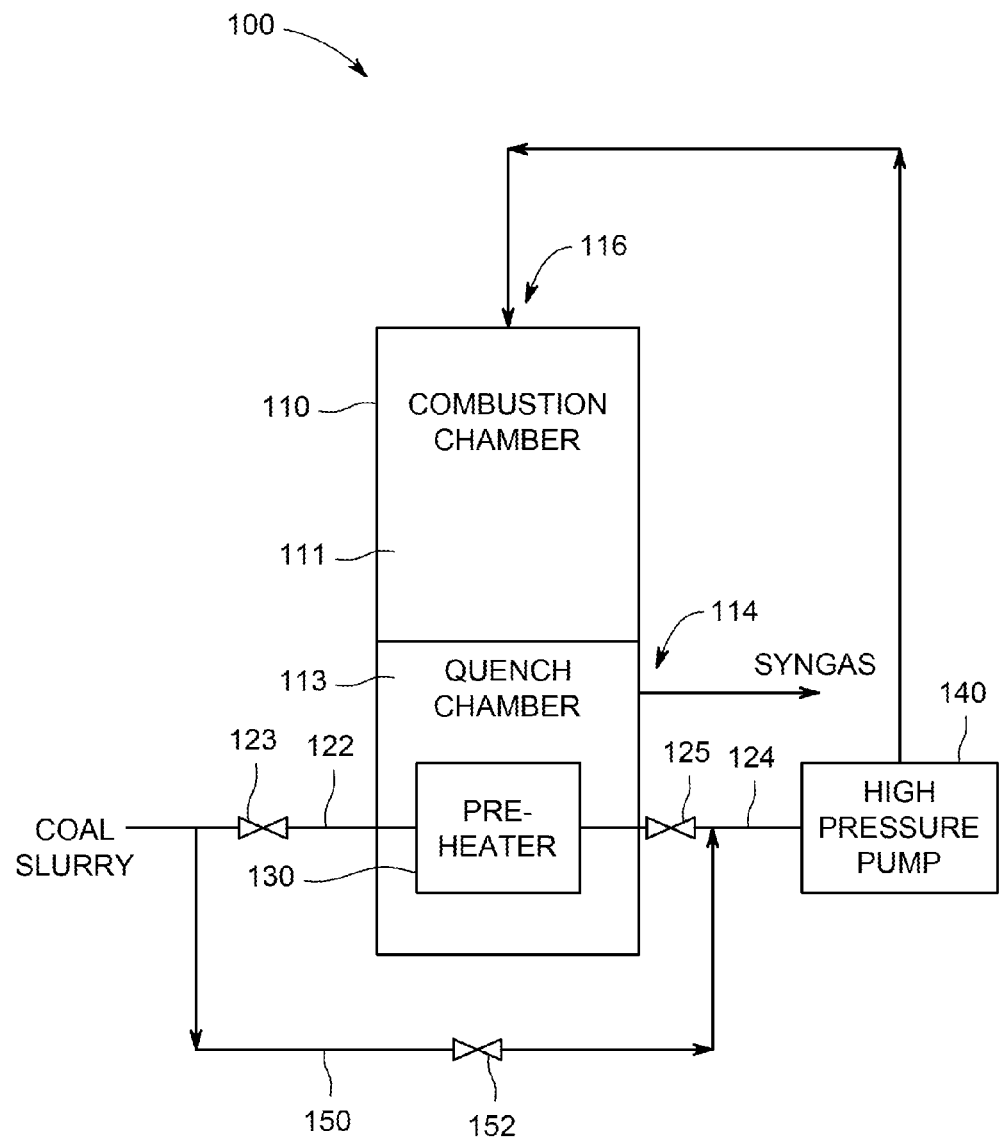
Figure 2:
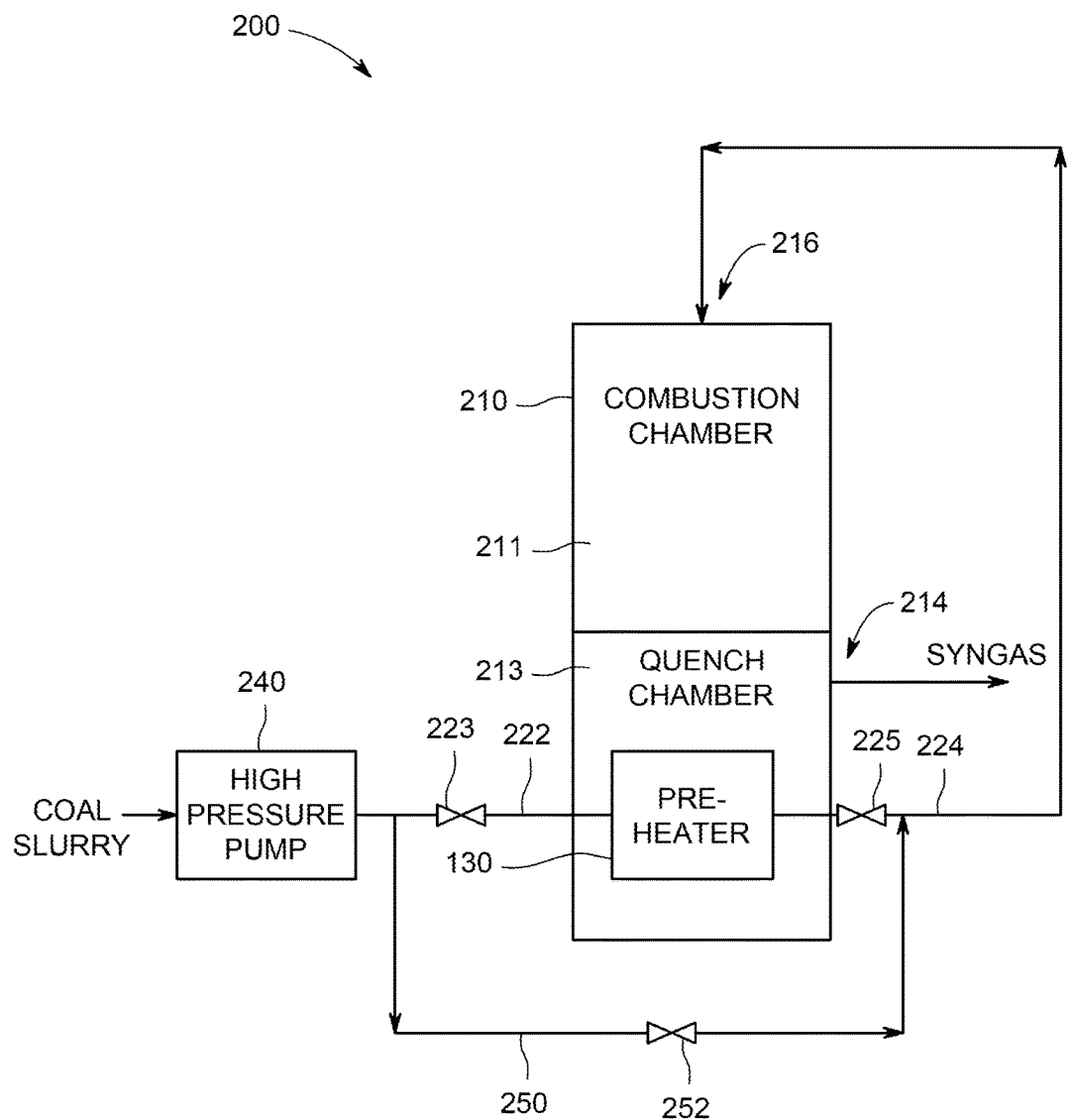
Figure 3:
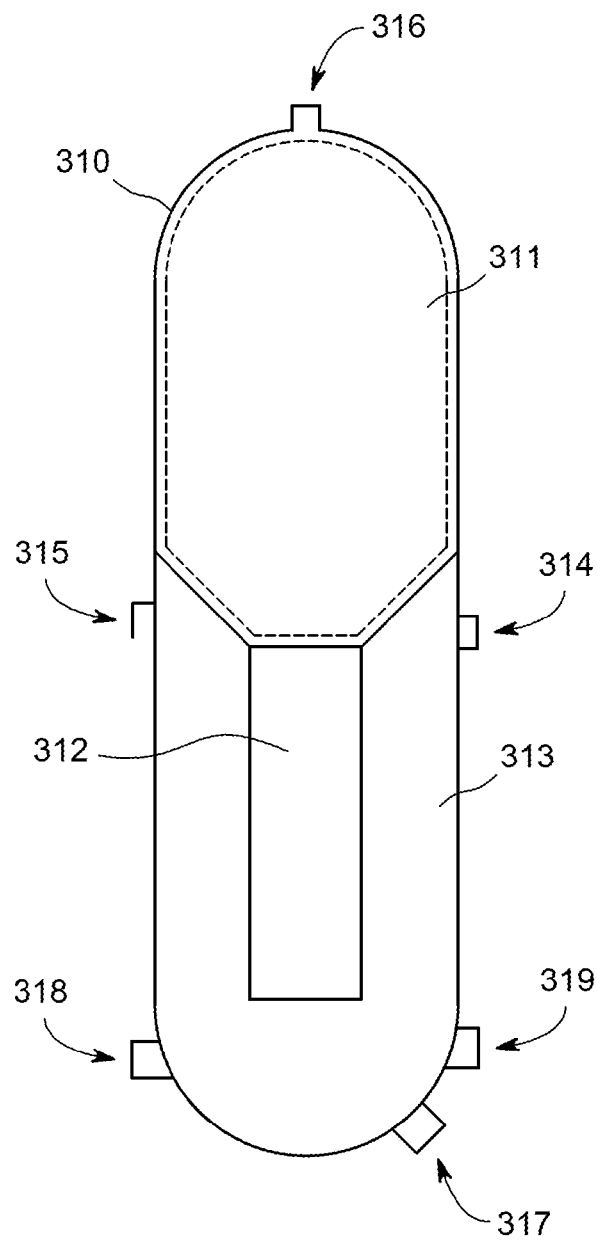
Figure 4A:
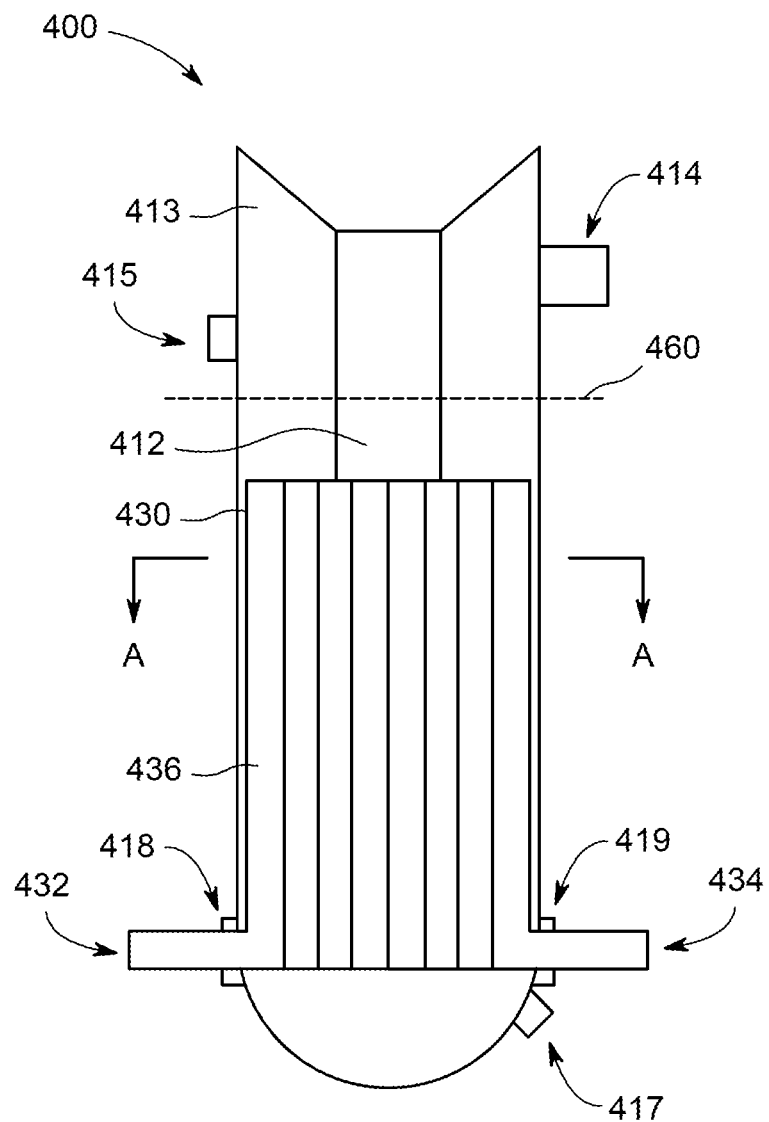
Figure 4B:
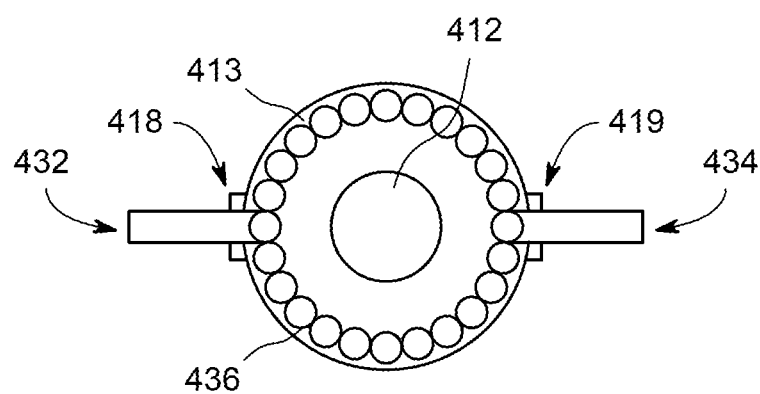
Figure 5A:
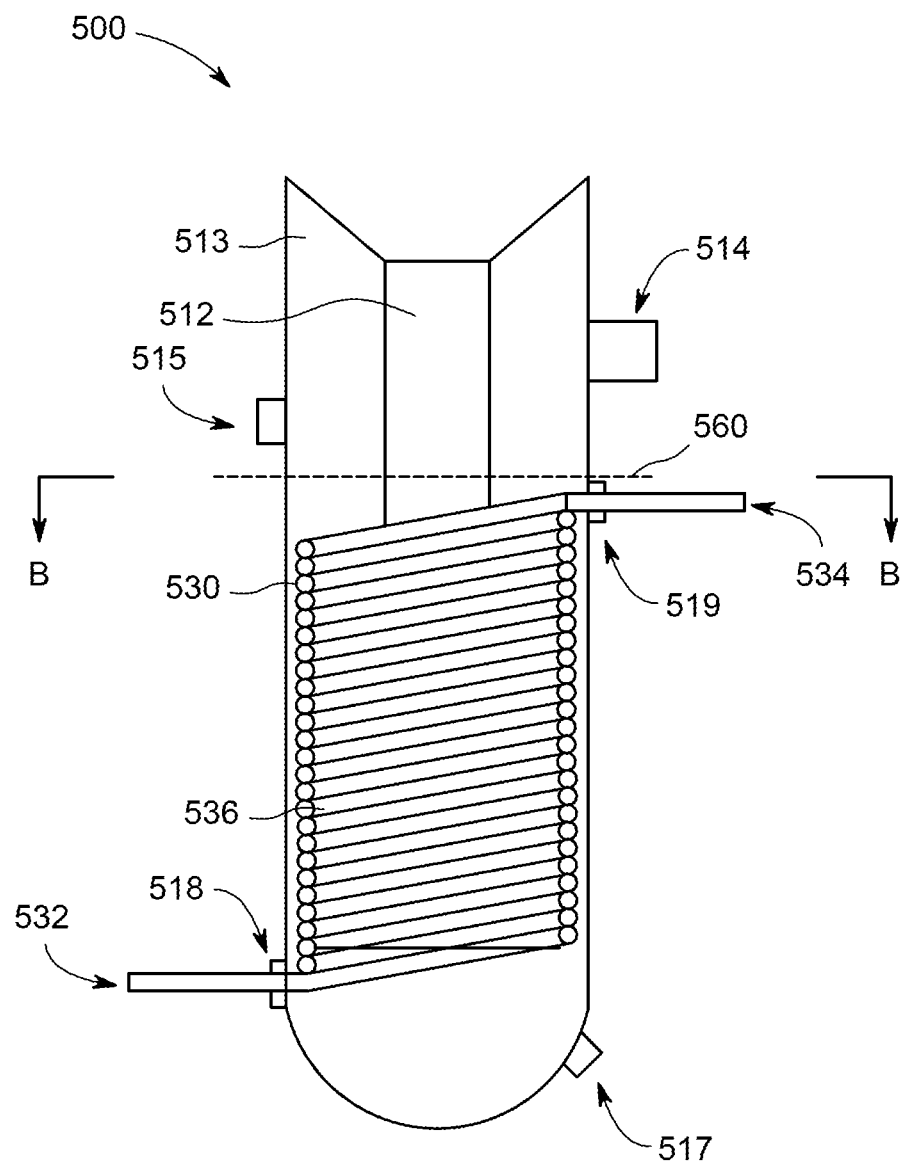
Figure 5B:
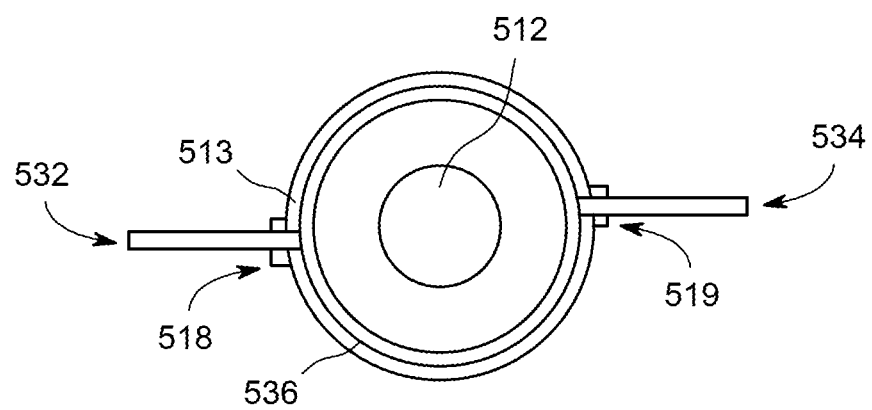

Drawing 2 shows a coal gasification system in another embodiment.

Drawing 3 shows a schematic drawing of a sample coal gasification device in an embodiment.

Drawing 4A is a part sectioned view of a coal gasification system in an embodiment, which shows the quench chamber of the mentioned coal gasification system and the preheat in the mentioned quench chamber.

Drawing 4B is the sectioned view in A-A direction of the structure shown in Drawing 4A.

Drawing 5A is a part sectioned view of a coal gasification system in another embodiment, which shows the quench chamber in the mentioned coal gasification system and the preheater in the mentioned quench chamber.

Drawing 5B is the sectioned view in B-B direction of the structure shown in Drawing 5A.

DETAILED DESCRIPTION OF THE INVENTION

Hereinafter, the specific embodiments of this invention are detailed specified. Unless otherwise defined, the technical terms or scientific terms used in the claims and the specification shall contain the normal meaning that could be understood by the technical personnel of the technical domain of this invention.

The term "one" or "one unit" or other similar terms used in the patent application specification and the claims of this invention does not represents the limitation of quantity, but represents that at least one existing. The term "including" or "containing" or other similar terms represents that the element or object before the term "including" or "containing" covering the element or object and its equal element listed after the term "including" or "containing", and does not exclude other elements or objects. The approximate language used in this paper could be used for quantitative expression, to represent that a certain level of change of quantity being acceptable under the condition that no change of fundamental function. Therefore, the value that limited by the terms that "about". "More or less" is not limited within the mentioned accurate value itself. In addition, in the expression that "about the first value to the second value", the term "about" limits two values of the first value and the second value in the meantime. Under some circumstances, the approximate language might be related with the accuracy of measurement equipment. The value mentioned in this invention includes the entire value increasing from low to high one unit by one unit, further, hereby assumed that there are at least two units between the lower value and the higher value. For instance, if it is expressed that the quantity of one composition or the value of one process parameter, for instance, temperature, pressure, time, etc, being the best from 30 to 70, comparatively good from 20 to 80, and normal from 1 to 90, it shows that it has been listed in this specification that the value of 15 to 85, 22 to 68, 43 to 51 and 30 to 32 obviously. For the value lower than 1, the unit of 0.0001, 0.001, 0.01 or 0.1 shall be considered as the proper unit. The above-mentioned examples are only for illustration, in fact, the entire value combination between the lowest and highest value listed shall be deemed as that obviously listed in this specification.

The embodiment of this invention involves with coal slurry preheater that preheating the feeding coal slurry of the gasification furnace by the heat of the quench chamber in the gasification furnace, and the coal gasification system that utilizing the mentioned coal slurry preheater and the coal gasification method.

In some embodiment, as shown in Drawing 1, a coal gasification system 100 contains the coal gasification device 110 that converting the coal slurry into syngas and the preheater 130 that preheating the feeding coal slurry of the mentioned gasification device 110. Wherein, the mentioned gasification device 110 contains the gasifier (combustion chamber) 111 and quench chamber 113, the coal slurry is converted into high temperature syngas in the gasifier 111, and the mentioned high temperature syngas enters into the next process unit after cooled down in the quench chamber 113 from the outlet 114 (not shown in Drawing). In some embodiments, there is water loaded in the mentioned quench chamber 113, the water is used to quench the high temperature syngas passing through. The mentioned preheater 130 is installed in the mentioned quench chamber 113, and the coal slurry is preheated by the heat in the quench chamber 113. The mentioned preheater 130 connects with the equipment or device that providing the feeding coal slurry on the front end thereof via the pipe 122, to receive the coal slurry to be preheated, and connects with the coal slurry feed inlet 116 of the gasifier 111 at the back end thereof via the pipe 124, to deliver the preheated coal slurry to gasifier 112 for gasification. The mentioned pipe 122 and 124 could contain one or multiple devices, like valve to control the flow of coal slurry. For instance, in the embodiment as shown in Drawing, the valve 123 connects in the pipe 122, and the valve 125 connects in the pipe 124.

The high pressure pump could be connected with the front end or back end of the mentioned preheater 130 to provide the power to deliver the coal slurry to the gasifier 111. For instance, in the embodiment as shown in Drawing, in the pipe 124 on the back end of the preheater 130, a high pressure pump 140 connects between the coal slurry outlet of the preheater 130 and the coal slurry feed inlet 116 of the gasifier 111, specifically, the mentioned high pressure pump 140 is located between the valve 125 and the coal slurry feed inlet 116 of the gasifier 111. The coal slurry preheated by the mentioned preheater 130 contains better fluidic status, which could be easier driven by the high pressure pump 140 at the back end.

In addition, a coal slurry delivery path 150 that in parallel with the mentioned preheater 130 could be prepared for spare. In case that the preheater 130 in fault or damaged, the mentioned spare path 150 could be used to deliver the raw material coal slurry to the gasifier 111. In the embodiment as shown in Drawing, one end of the spare coal slurry delivery path 150 connects with the front end of valve 123, and the other end thereof connects between the valve 125 and high pressure pump 140. The mentioned spare coal slurry delivery path 150 contains at least one valve 152, further, when the coal slurry delivery path of which the preheater 130 on operating normally, the mentioned valve 152 could be closed to prevent the coal slurry passing through the spare path 150, and once the preheater 30 in fault or damaged, the valve 123 could be closed to prevent the coal slurry passing through the preheater 130, and the valve 152 is opened to cause the coal slurry passing through the spare path 150.

A similar coal gasification system 200 is shown in Drawing 2, which contains the coal gasifier 210, the preheater 230, and the spare coal slurry delivery path 250 in parallel connection with the mentioned preheater 230. Wherein, the mentioned gasifier 210 contains the gasification chamber 211 and the quench chamber 213, the mentioned preheater 230 is installed inside the quench chamber 213, and the coal slurry is preheated by the heat in the quench chamber 213. The mentioned preheater 230 connects with the equipment or device that supplying the coal slurry feeding (not shown in Drawing) at the front end via the pipe 222, to receive the coal slurry to be preheated, and connects with the coal slurry feed inlet 216 of the gasification chamber 211 at the back end via the pipe 224, to deliver the preheated coal slurry to the gasification chamber 211 for gasification. The valve 223 is connected in the pipe 222, and the valve 225 is connected in the pipe 224. The main difference between the mentioned coal gasification system 200 and the system 100 shall be that, the high pressure pump 240 in the system 200 connecting with the pipe 222 at the front end of the preheater 230, specifically, connecting with the front end of the valve 223, and one end of the spare coal slurry delivery path 250 connects between the high pressure pump 240 and the valve 223, and the other end thereof connects between the valve 225 and the coal slurry feed inlet 216 of the gasification chamber 211. The mentioned high pressure pump 240 connects with the front end of the preheater 230, to cause the mentioned high pressure pump 240 avoiding to contact the preheated coal slurry in high temperature, therefore, the requirement of high temperature resistance, etc. shall be less strict.

A schematic drawing of a coal gasification device 310 for the mentioned coal gasification system in an embodiment is shown in Drawing 3. As shown in Drawing 3, the coal gasification device 310 contains the gasification chamber 311 and the quench chamber 313, wherein, the upper part of the coal gasification device 310 is the coal gasification chamber 311, and the lower part thereof is the quench chamber 313, wherein the downcomer pipe 312 is installed, to deliver the high temperature syngas from the gasification chamber 311 to the quench chamber 313 for cooling. In addition, the gasification chamber 311 contains at least one raw material inlet 316, the quench chamber 313 contains the syngas outlet 314 for outputting syngas, the water inlet 315 for introducing cooling water into the quench chamber 313 and the black water outlet 317 for discharging the black water generated after cooling the syngas out of the quench chamber 313. The quench chamber 313 also contain the opens 318 and 319, which separately is used to cooperate with the inlet and outlet of the coal slurry preheater that installed in the quench chamber 313 (not shown in Drawing 3, please refer to 430 of Drawing 4A and 530 of Drawing 5A), to receive the coal slurry to be preheated to enter into the mentioned coal slurry preheater and output the preheated coal slurry from the mentioned coal slurry preheater. In a specific embodiment, the coal slurry input pipe and output pipe of the coal slurry preheater in the quench chamber 313 could pass through the mentioned opens 318 and 319, to connect the corresponding devices at the front or back end.

The Drawing 4A is a part sectioned view of a coal gasification system 400 in an embodiment, which shows the quench chamber 413 in the mentioned coal gasification system and the preheater 430 in the mentioned quench chamber 413. The Drawing 4B is the sectioned view of the structure shown in Drawing 4A in A-A direction. As shown in Drawings 4A and 4B, the preheater 430 contains the inlet 432 that receiving the coal slurry to be preheated, the outlet 434 to deliver the preheated coal slurry that connecting with one inlet of gasifier of coal gasification system, and the pipe device 436 connecting with mentioned inlet 432 and outlet 434. A passage is formed in the mentioned pipe device 436 that connecting with the mentioned inlet 432 and outlet 434, and the mentioned coal slurry could pass the mentioned passage and be preheated in the meantime.

In the embodiment as shown in Drawing, the mentioned pipe device 436 contains a cylinder corrugated folded by a pipe that could deliver coal slurry along with the inner surface of quench chamber 413. Specifically, the mentioned cylinder could contain multiple vertical pipes arranged loop around and the elbow connecting the mentioned multiple vertical pipes in pairs. The outer diameter of the cylinder is smaller than the inner diameter of the mentioned quench chamber 413, and the inner diameter thereof is larger than the outer diameter of the downcomer pipe 412 for delivering the syngas from the gasification chamber (not shown in Drawing) to the mentioned quench chamber 413 for cooling, therefore, it could be arranged between the mentioned downcomer pipe 412 and the inner wall of the mentioned quench chamber 413. In some embodiments, as opposed to the mentioned downcomer pipe 412, the mentioned cylinder is radially closer to the inner wall of the mentioned quench chamber 413. In the specific embodiment as shown in Drawing, the outer diameter of the mentioned cylinder is closer but smaller than the inner diameter of the mentioned quench chamber 413, which causes that the space formed between the pipe device 436 and the quench chamber 413 to cause the preheating media (like water) entering. In some embodiments, the mentioned quench chamber 413 is configured to cool the syngas from the downcomer pipe 412 by water, the mentioned pipe device 436 is arranged under a water level 460 at a normal operation condition in the quench chamber 413, and to cause the pipe device 436 being submerged in the water of the quench chamber 413.

During the operation of coal gasification system, the water is introduced into the quench chamber 413 via the water inlet 415 of the quench chamber 413, to cool the high temperature syngas from the downcomer pipe 412, and the cooled syngas is outputted via the syngas outlet 414 of the quench chamber 413, further, the black water generated during cooling is discharged via the black water outlet 417 of the quench chamber 413. The coal slurry to be preheated enters into the pipe device 436 via the inlet 432, to be preheated by the heat in the quench chamber 413, and the preheated coal slurry is outputted via the outlet 434 to the gasifier for gasification to generate syngas. The heat in mentioned quench chamber 413 for preheating the coal slurry could directly come from the heat of syngas in quench chamber 413, and also could come from the heat of the water heated by the syngas.

Drawing 5A is a part sectioned view of a coal gasification system 500 of another embodiment, which shows the quench chamber 513 in the mentioned coal gasification system and the preheater 530 in the mentioned quench chamber 513. Drawing 5B is a sectioned view of the structure shown in Drawing 5A in B-B direction. Similar with the structure shown in Drawings 4A and 4B, the preheater 530 contains the inlet 532 for receiving the coal slurry to be preheated, the outlet 534 for outputting the preheated coal slurry and connecting with one inlet of gasifier in coal gasification system, and the pipe device 536 that connecting the mentioned inlet 532 and outlet 534. The passage is formed in the mentioned pipe device 536 that connecting with the mentioned inlet 532 an outlet 534, and the mentioned passage could cause the mentioned coal slurry pass through and being preheated in the meantime. It is different from the pipe device shown in Drawing 4A and 4B that, the mentioned pipe device 536 containing a cylinder corrugated folded spirally wound by a pipe that could deliver coal slurry along with the inner surface of quench chamber 513. The other structure of the coal gasification system 500 is similar with the structures of the coal gasification system 400, which would not be additionally described.

In the mentioned embodiment, the arrangement of the structure, configuration and dimension of the pipe device 436 or 536 cause the temperature of the preheated coal slurry outputted from it being at least more than 40% of the temperature thereof in the quench chamber, or further, being at least more than 50% of the temperature thereof in the quench chamber, or furthermore, being at least more than 65% of the temperature thereof in the quench chamber. In a specific embodiment, the temperature of the mentioned quench chamber is within the range of about 200° C. to 350° C., or further, within the range of about 220° C. to 300° C., or furthermore, within the range of about 220° C. to 240° C., and the temperature of the mentioned coal slurry for preheating is at about 50° C., and the temperature of the preheated coal slurry is within the range of about 100° C. to 300° C., or furthermore, within the range of about 150° C. to 250° C.

The preheater in the embodiment of this invention could preheat the mentioned coal slurry to a proper temperature, further, in the meantime of increasing the temperature of the mentioned coal slurry, the good performance and state of the coal slurry could also be ensured, for instance, the good flow state thereof could be ensured. The mentioned coal slurry preheating way fully and effectively utilizes the low grade heat in the quench chamber to increase the initial feed temperature of the coal slurry, in which way, to improve the energy efficiency during the entire coal water slurry gasification process. By properly increasing the initial temperature of coal water slurry, the good flow state of coal slurry could be ensured, and the efficiency of coal water slurry could be improved, for instance, the oxygen consumption and coal consumption during the gasification process could be reduced. Therefore, the coal gasification system of the mentioned embodiment contains the advantages of high efficiency, energy saving, simple structure and jam resistance, etc.

This invention could be specified in other specific way that not violating the spirit or main character of this invention. Therefore, the above-mentioned embodiments shall only be deemed as the specification for this invention, but not limit this invention, and the scope of this invention shall be defined by the claims, not defined by the above-mentioned specific embodiments, therefore, any change within the meaning and scope equal to the claims of this invention shall be deemed as that within the scope of the claims.

What is claimed is:

1. A gasification system, comprising:
   a gasifier comprising a gasification chamber and a quench chamber, wherein the gasification chamber is configured to produce syngas from a coal slurry, and the quench chamber is configured to cool the syngas from the gasification chamber by transferring heat into a quench liquid;
   a coal slurry source; and
   a preheater located in the quench chamber at least partially below a liquid level of the quench liquid, wherein the preheater comprises a passage extending between a first coal slurry inlet and a coal slurry outlet, the first coal slurry inlet is coupled to the coal slurry source, the coal slurry outlet is coupled to a second coal slurry inlet into the gasification chamber, and the preheater is configured to transfer heat from the quench liquid to the coal slurry in the passage to preheat the coal slurry before the coal slurry enters the gasification chamber through the second coal slurry inlet.

2. The gasification system according to claim 1, further comprising a downcomer pipe configured to flow the syngas from the gasification chamber into the quench chamber below the liquid level of the quench liquid, and wherein the first passage of the preheater is disposed between an outer face of the downcomer pipe and an inner face of the quench chamber.

3. The gasification system according to claim 2, wherein the preheater comprises a pipe substantially wound as a cylinder, the cylinder having an outer diameter smaller than an inner diameter of the quench chamber and an inner diameter larger than an outer diameter of the downcomer pipe.

4. The gasification system according to claim 3, wherein the cylinder is radially closer to the quench chamber than the downcomer pipe.

5. The gasification system according to claim 3, wherein the pipe is spirally wound or is corrugated folded.

6. The gasification system according to claim 1, wherein the quench liquid comprises water, the liquid level comprises a water level of the water, and the preheater is arranged under the water level at a normal operational condition in the quench chamber.

7. The gasification system according to claim 1, further comprising a high pressure pump connected between the coal slurry outlet of the preheater and the second coal slurry inlet into the gasification chamber.

8. The gasification system according to claim 1, further comprising a high pressure pump upstream of the first coal slurry inlet of the preheater.

9. The gasification system according to claim 1, comprising a bypass conduit coupled to the first coal slurry inlet and the coal slurry outlet, wherein the bypass conduit extends outside of the gasifier to bypass the preheater, wherein at least one valve is configured to control flows of the coal slurry through the passage in the preheater and through the bypass conduit.

10. The gasification system according to claim 1, wherein the preheater is disposed only in the quench chamber entirely below a bottom wall of the gasification chamber.

11. A gasification system, comprising:
    a gasifier comprising a gasification chamber and a quench chamber, wherein the gasification chamber is configured to produce a syngas from a coal slurry, and the quench chamber is configured to cool the syngas from the gasification chamber by transferring heat into a quench liquid;
    a coal slurry source;
    a preheater located in the quench chamber, wherein the preheater comprises a passage extending between a first coal slurry inlet and a coal slurry outlet, the first coal slurry inlet is coupled to the coal slurry source, the coal slurry outlet is coupled to a second coal slurry inlet into the gasification chamber, and the preheater is configured to transfer heat from the quench chamber to the coal slurry in the passage to preheat the coal slurry before the coal slurry enters the gasification chamber through the second coal slurry inlet; and
    a downcomer pipe configured to flow the syngas from the gasification chamber into the quench chamber, wherein the downcomer pipe comprises a first end coupled to the gasification chamber and a second end disposed below a liquid level of the quench liquid in the quench chamber, wherein the preheater is disposed about the downcomer pipe, and wherein the preheater is disposed between the first end of the downcomer pipe and a bottom of the quench chamber.

12. The gasification system according to claim 11, wherein the preheater comprises an annular structure disposed about the downcomer pipe, wherein the preheater has an outer diameter smaller than an inner chamber diameter of the quench chamber and an inner diameter larger than an outer pipe diameter of the downcomer pipe, and wherein the preheater is disposed between an outer face of the downcomer pipe and an inner face of the quench chamber and is arranged entirely below the first end of the downcomer pipe.

13. The gasification system according to claim 11, wherein the quench chamber comprises the quench liquid disposed at the liquid level, and the preheater is submerged in the quench liquid entirely below the liquid level.

14. The gasification system according to claim 11, further comprising a high pressure pump connected between the coal slurry outlet of the preheater and the second coal slurry inlet into the gasification chamber.

15. The gasification system according to claim 11, further comprising a high pressure pump upstream of the first coal slurry inlet of the preheater.

16. The gasification system according to claim 11, wherein the preheater comprises a pipe that is spirally wound or is corrugated folded.

17. The gasification system according to claim 11, wherein the preheater is disposed only in the quench chamber entirely below a bottom wall of the gasification chamber.

* * * * *